US009473803B2

(12) United States Patent
Wang

(10) Patent No.: US 9,473,803 B2
(45) Date of Patent: Oct. 18, 2016

(54) PERSONALIZED CHANNEL RECOMMENDATION METHOD AND SYSTEM

(71) Applicant: TCL RESEARCH AMERICA INC., San Jose, CA (US)

(72) Inventor: Haohong Wang, San Jose, CA (US)

(73) Assignee: TCL RESEARCH AMERICA INC., San Jose, CA (US)

( * ) Notice: Subject to any disclaimer, the term of this patent is extended or adjusted under 35 U.S.C. 154(b) by 117 days.

(21) Appl. No.: 14/454,969

(22) Filed: Aug. 8, 2014

(65) Prior Publication Data

US 2016/0044357 A1    Feb. 11, 2016

(51) Int. Cl.
| | |
|---|---|
| H04N 7/10 | (2006.01) |
| H04N 21/2668 | (2011.01) |
| H04N 5/91 | (2006.01) |
| G06K 9/00 | (2006.01) |
| H04H 60/43 | (2008.01) |
| H04H 60/33 | (2008.01) |
| H04N 21/442 | (2011.01) |
| H04N 21/433 | (2011.01) |
| H04N 21/25 | (2011.01) |
| H04N 21/44 | (2011.01) |
| H04N 21/6543 | (2011.01) |
| H04N 5/76 | (2006.01) |
| H04H 20/40 | (2008.01) |
| H04H 60/59 | (2008.01) |

(52) U.S. Cl.
CPC ...... *H04N 21/2668* (2013.01); *G06K 9/00523* (2013.01); *H04H 20/40* (2013.01); *H04H 60/33* (2013.01); *H04H 60/43* (2013.01); *H04H 60/59* (2013.01); *H04N 5/76* (2013.01); *H04N 5/91* (2013.01); *H04N 21/251* (2013.01); *H04N 21/4334* (2013.01); *H04N 21/44008* (2013.01); *H04N 21/44218* (2013.01); *H04N 21/44222* (2013.01); *H04N 21/6543* (2013.01)

(58) Field of Classification Search
CPC ............... H04N 21/23418; H04N 21/44008; H04N 21/4826; H04N 21/45
See application file for complete search history.

(56) References Cited

U.S. PATENT DOCUMENTS 6,418,424 B1 *  7/2002  Hoffberg ............... G06F 3/00
386/E5.004

(Continued)

*Primary Examiner* — Pankaj Kumar
*Assistant Examiner* — Timothy Newlin
(74) *Attorney, Agent, or Firm* — Anova Law Group, PLLC

(57) ABSTRACT

A personalized channel recommendation method includes recording video programs of a plurality of channels, extracting image features of the recorded video programs of the plurality of channels, and storing the extracted image features of the recorded video programs of the plurality of channels in a feature database. The method also includes obtaining image feature data extracted from a video program being viewed by at least one user of a user device on a current channel, and detecting that the video program being watched by the user is an undesired program and determining a channel number of a channel of the video program being watched based on the image feature data and the feature database. Further, the method includes determining channel recommendation including at least one desired channel to be switched to from the undesired program, and generating an adaptive TV guide for the user to skip the undesired program and to switch to the desired channel.

15 Claims, 7 Drawing Sheets

(56) References Cited

U.S. PATENT DOCUMENTS

| | | | | |
|---|---|---|---|---|
| 6,744,922 B1* | 6/2004 | Walker | G06F 17/30787 | 375/E7.271 |
| 8,165,450 B2* | 4/2012 | Casagrande | G11B 27/105 | 386/241 |
| 8,359,642 B1* | 1/2013 | Wurtenberger | H04L 63/0227 | 709/206 |
| 2002/0120925 A1* | 8/2002 | Logan | A23L 1/3002 | 725/9 |
| 2002/0147782 A1* | 10/2002 | Dimitrova | H04N 7/163 | 709/207 |
| 2003/0011716 A1* | 1/2003 | Vogel | H04N 5/4401 | 348/633 |
| 2003/0072491 A1* | 4/2003 | Sirivara | G06F 21/10 | 382/220 |
| 2003/0192045 A1* | 10/2003 | Fellenstein | H04N 5/445 | 725/29 |
| 2004/0170392 A1* | 9/2004 | Lu | G06F 17/30787 | 386/240 |
| 2004/0230994 A1* | 11/2004 | Urdang | H04N 7/17318 | 725/88 |
| 2005/0177847 A1* | 8/2005 | Konig | G06F 17/30802 | 725/41 |
| 2006/0195860 A1* | 8/2006 | Eldering | G06F 17/30802 | 725/19 |
| 2007/0041667 A1* | 2/2007 | Cox | G06F 17/30017 | 382/305 |
| 2009/0041311 A1* | 2/2009 | Hundley | H04N 21/4223 | 382/118 |
| 2009/0125937 A1* | 5/2009 | Verhaegh | H04N 7/163 | 725/38 |
| 2012/0051651 A1* | 3/2012 | Yamaoka | G06F 3/011 | 382/195 |
| 2012/0123780 A1* | 5/2012 | Gao | G06K 9/00751 | 704/245 |
| 2012/0124638 A1* | 5/2012 | King | G06Q 10/101 | 726/1 |
| 2013/0101209 A1* | 4/2013 | Tian | H04N 21/44008 | 382/164 |
| 2013/0114902 A1* | 5/2013 | Sukthankar | H04N 9/8205 | 382/190 |
| 2013/0312042 A1* | 11/2013 | Shaw | H04N 21/23439 | 725/62 |
| 2014/0168442 A1* | 6/2014 | Salomon | H04N 21/21805 | 348/157 |
| 2014/0328570 A1* | 11/2014 | Cheng | G11B 27/10 | 386/241 |

* cited by examiner

PERSONALIZED CHANNEL RECOMMENDATION METHOD AND SYSTEM

FIELD OF THE INVENTION

The present invention generally relates to the field of information technology and user interface technologies and, more particularly, to personalized recommendation methods and systems for electronic program guide.

BACKGROUND

Nowadays TV watching is still one of main entertainment activities for human being. With the rapid development of television and communication technologies, current smart TV systems are made to improve user experiences. For example, some smart TV systems can identify programs that fit user interests.

However, there is certain part of the TV program that is not desirable for users. For example, parental guidance-13 (PG-13) films or restricted content are undesirable for kids, or some people feel distracted by inserted commercial ads in the middle of a show. The current smart TV systems often cannot help users skip undesired programs with an adaptive TV guide function.

The disclosed methods and systems are directed to solve one or more problems set forth above and other problems.

BRIEF SUMMARY OF THE DISCLOSURE

One aspect of the present disclosure includes a personalized channel recommendation method. The method includes recording video programs of a plurality of channels, extracting image features of the recorded video programs of the plurality of channels, and storing the extracted image features of the recorded video programs of the plurality of channels in a feature database. The method also includes obtaining image feature data extracted from a video program being viewed by at least one user of a user device on a current channel, and detecting that the video program being watched by the user is an undesired program and determining a channel number of a channel of the video program being watched based on the image feature data and the feature database. Further, the method includes determining channel recommendation including at least one desired channel to be switched to from the undesired program, and generating an adaptive TV guide for the user to skip the undesired program and to switch to the desired channel.

Another aspect of the present disclosure includes a personalized channel recommendation system. The system includes a recorder module, a feature extraction module, an image classifier module, and a channel recommender module. The recorder module is configured to record video programs of a plurality of channels. The feature extraction module is configured to extract image features of the recorded video programs of the plurality of channels and to store the extracted image features of the recorded video programs of the plurality of channels in a feature database. Further, the image classifier module is configured to obtain image feature data extracted from a video program being viewed by at least one user of a user device on a current channel, to detect that the video program being watched by the user is an undesired program, and to determine a channel number of a channel of the video program being watched based on the image feature data and the feature database. The channel recommender module is configured to determine channel recommendation including at least one desired channel to be switched to from the undesired program, and to generate an adaptive TV guide for the user to skip the undesired program and to switch to the desired channel.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
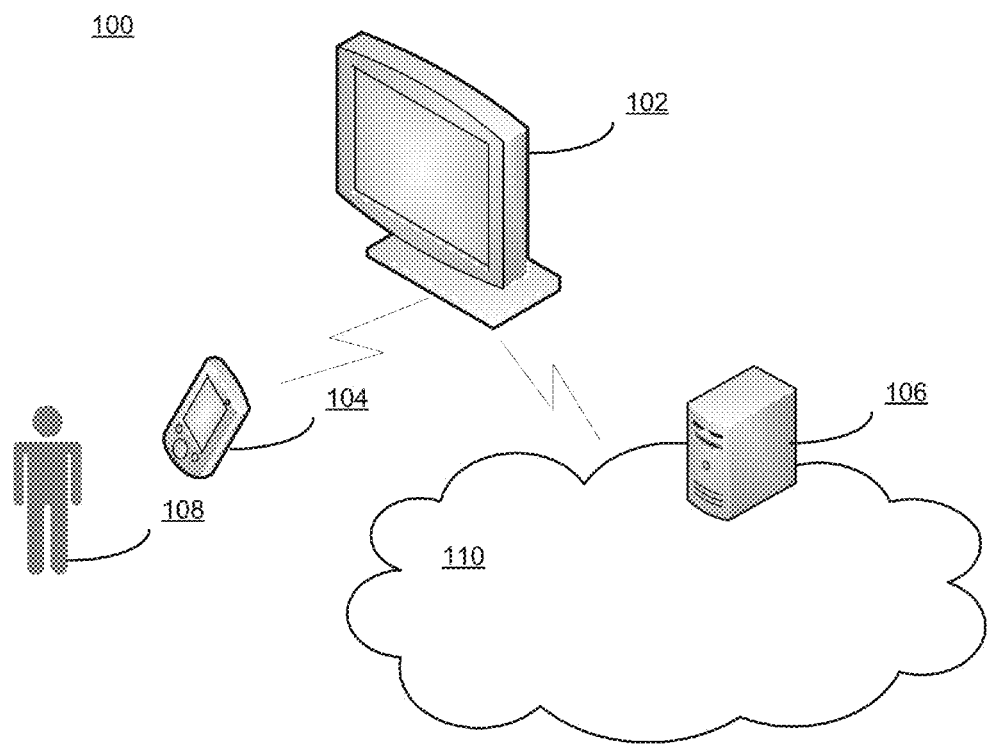
FIG. 1 illustrates an exemplary environment incorporating certain embodiments of the present invention.

FIG. 1 illustrates an exemplary environment 100 incorporating certain embodiments of the present invention. As shown in FIG. 1, environment 100 may include a television set (TV) 102, a remote control 104, a server 106, a user 108, and a network 110. Other devices may also be included.

TV 102 may include any appropriate type of TV, such as plasma TV, liquid crystal display (LCD) TV, projection TV, non-smart TV, or smart TV. TV 102 may also include other computing systems, such as a personal computer (PC), a tablet or mobile computer, or a smart phone, etc. Further, TV 102 may be any appropriate content-presentation device capable of presenting multiple programs in one or more channels, which may be controlled through the remote control 104.

The remote control 104 may include any appropriate type of remote control that communicates with and controls the TV 102, such as a customized TV remote control, a universal remote control, a tablet computer, a smart phone, or any other computing device capable of performing remote control functions. The remote control 104 may also include other types of devices, such as a motion-sensor based remote control, or a depth-camera enhanced remote control, as well as simple input/output devices such as a keyboard, a mouse, and a voice-activated input device, etc.

Further, the server 106 may include any appropriate type of server computer or a plurality of server computers for providing personalized video contents to the user 108. The server 106 may also facilitate communication, data storage, and data processing between the remote control 104 and TV 102. TV 102, remote control 104, and server 106 may communicate with each other through one or more communication networks 110, such as a cable network, a phone network, and/or a satellite network, etc.

The user 108 may interact with TV 102 using remote control 104 to watch various programs and perform other activities of interest, or the user may simply use hand or body gestures to control TV 102 if motion sensor or depth-camera is used by TV 102. The user 108 may be a single user or a plurality of users, such as family members watching TV programs together.

Figure 2:
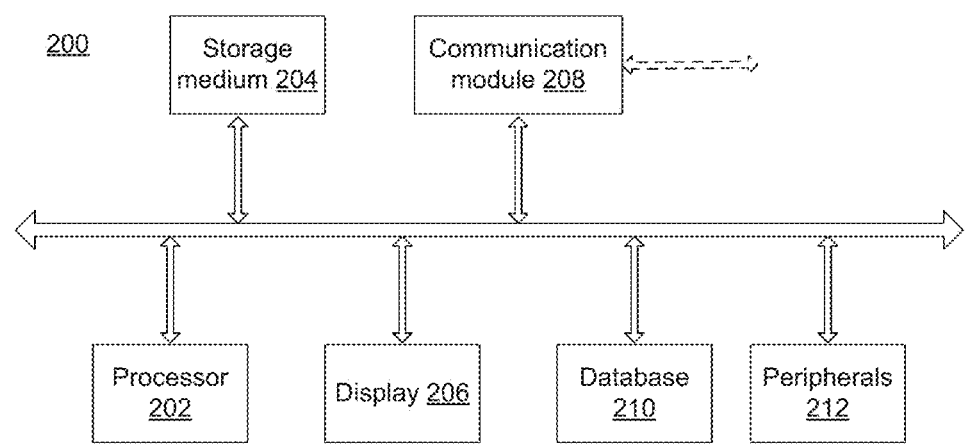
FIG. 2 illustrates an exemplary computing system consistent with the disclosed embodiments.

TV 102, remote control 104, and/or server 106 may be implemented on any appropriate computing circuitry platform. FIG. 2 shows a block diagram of an exemplary computing system 200 capable of implementing TV 102, remote control 104, and/or server 106.

As shown in FIG. 2, computing system 200 may include a processor 202, a storage medium 204, a display 206, a communication module 208, a database 210, and peripherals 212. Certain devices may be omitted and other devices may be included.

Processor 202 may include any appropriate processor or processors. Further, processor 202 can include multiple cores for multi-thread or parallel processing. Storage medium 204 may include memory modules, such as ROM, RAM, flash memory modules, and mass storages, such as CD-ROM and hard disk, etc. Storage medium 204 may store computer programs for implementing various processes when the computer programs are executed by processor 202.

Further, peripherals 212 may include various sensors and other I/O devices, such as keyboard and mouse, and communication module 208 may include certain network interface devices for establishing connections through communication networks. Database 210 may include one or more databases for storing certain data and for performing certain operations on the stored data, such as database searching.

In operation, the server 106, the TV 102, and/or the remote control 104 may perform a personalized recommendation process for the user 108. The personalized recommendation process, with respect to electronic program guide, may generate adaptive TV guide to skip undesired video programs based on features of the received streaming videos and the user behaviors.

Figure 3:
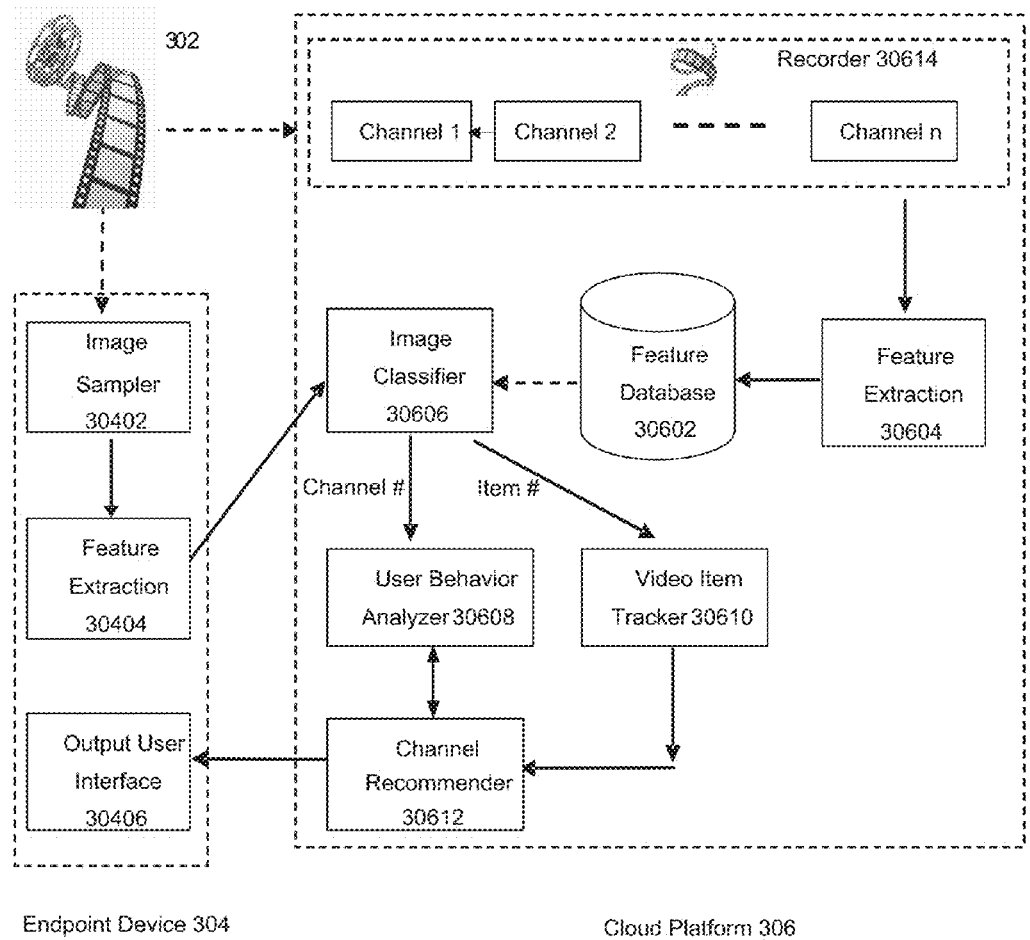
FIG. 3 illustrates a structure schematic diagram of an exemplary personalized channel recommendation system consistent with the disclosed embodiments.

FIG. 3 illustrates a structure schematic diagram of an exemplary personalized recommendation system consistent with the disclosed embodiments. The personalized recommendation system is an enhanced scheme of video entertainment experience that helps users to skip undesired programs (such as Ads and restricted content) with an adaptive TV guide function.

As shown in FIG. 3, the personalized recommendation system may include a broadcasting system 302, an endpoint device 304, and a cloud platform 306. Other components or devices may also be included.

The broadcasting system 302 may be configured to deliver streaming videos to the endpoint device 304 and to the cloud platform 306. For example, the streaming videos may be broadcasting video programs, on-demand video programs, gaming programs, or any other video programs. Under certain circumstances, the video programs may include certain contents that target certain users but not all users, such as advertisements, or contents with different ratings.

The endpoint device 304 may be configured to play back the streaming videos to at least one user or to a group of users (e.g., a family). The endpoint device 304 may be a TV, a set-top box, a PC, a laptop, a Pad, a mobile device and others.

The endpoint device 304 (e.g., TV 102) may perform certain video operations to work with the cloud platform 306 (e.g., server 106) to implement the personalized channel recommendation process such that the user or users of the endpoint device 304 may be able to control the viewing contents in the streaming videos independently from the broadcasting system 302.

For example, the endpoint device 304 and/or the cloud platform 306 may be configured to generate adaptive TV guide to skip undesired video programs based on features of the received streaming videos and user behaviors. That is, based on the generated adaptive TV guide or recommendations, the user of the endpoint device may be able to easily select desired video contents to be played back on the endpoint device 304.

More specifically, the endpoint device 304 may include an image sampler 30402, a feature extraction module 30404, and a user interface 30406. Other components or devices may also be included.

Figure 4:
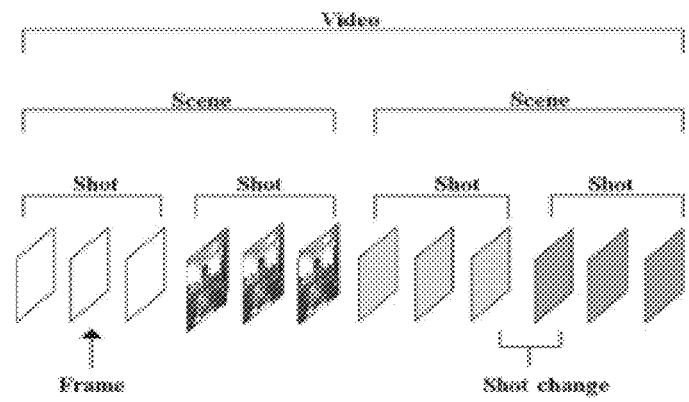
FIG. 4 illustrates a video stream with different video components consistent with the disclosed embodiments.

The image sampler 30402 may be configured to sample incoming video stream and to divide the video stream into different video components. As shown in FIG. 4, a video stream may be divided into scenes, a scene may be divided into shots, and a shot may be divided into frames. The frame can be further divided into objects, and features of the video frame may be extracted for further processing. The object recognition may be performed on the objects to identify one or more preconfigured subject, i.e., person.

That is, image sampler 30402 may call the feature extraction module 30404 to generate feature sets for the image classifier 30606. The image sampler 30402 samples incoming video stream, either by taking snapshot of the screen or obtaining the current video frame from the decoded frame buffer, or by other means.

The feature extraction module 30404 may be configured to extract features for image classification. It should be noted that the same feature extraction algorithm needs to be applied in both feature extraction module 30404 in the endpoint device 304 and feature extraction module 30604 in the cloud platform 306.

The output user interface 30406 may be configured to interact with the user or users of the endpoint device 304. For example, the output user interface 30406 may be configured to operate demonstrate updates (or even take controls depending on whether the component is linked to the remote control) from the channel recommender 30612 or may be configured to display an alternative program guide with channel(s) recommended to the user(s) to view or to switch to.

Specifically, the remote control 104 may support a personalized channel recommendation feature, and the user may click a button to skip an undesired program and return according to instructions from the channel recommender 30612. However, if the remote control 104 does not support the personalized recommendation feature (for example, remote control 104 may come with a set-top box and the personalized channel recommendation is installed in TV 102 but not set-top box, in which case the TV 102 is used more like a monitor), then the channel recommender 30612's instruction may appear on the screen of the TV 102 via the user interface 30406, but the user has to follow the instruction to take actions on the remote control 104 (e.g., a user switches to a specific channel manually) without a short-cut key to speed up the process of undesired program skipping.

Further, the cloud platform 306 may include a feature database 30602, a feature extraction module 30604, an image classifier 30606, a user behavior analyzer 30608, a video item tracker 30610, a channel recommender 30612, and a recorder 30614.

The recorder 30614 may be configured to record video sequences of each of a plurality of channels, Channel 1, Channel 2, . . . , Channel n. The recorder 30614 may receive the same streaming video from the broadcasting system 302 as the endpoint device 304.

The feature extraction module 30604 may be configured to extract features of at least some of the selected plurality of video frames of each of the plurality of channels. The feature extraction module 30604 may use the same algorithm as the feature extraction module 30404 in the endpoint device 304.

Further, the feature database 30602 may be configured to store the extracted features of each of the plurality of channels for the image classification.

The image classifier 30606 may be configured to determine the channel of the captured image based on the comparison of submitted feature set and the feature database 30602. The feature dataset may be organized in a way efficient for data retrieval.

The user behavior analyzer 30608 may be configured to analyze the watching behaviors of the user or users, such as tracing the channels that are selected by the user according to system recommendation and duration of watching.

The video item tracker 30610 may be configured to trace recognized video items that the user is watching so as to detect the moment that the undesired program starts and ends, so that the channel recommender 30612 can recommend desirable content to the user or remind the user to return to the original channel after skipping the undesired program.

Further, the channel recommender 30612 may be configured to recommend to the user which channel to go when skipping the undesired program. To make sure the quality of the recommendation. The channel recommender 30612 may consider certain factors for recommendation quality, such as the user's preferences, community trends, content correlation before and after switching, possible future undesired program detection, and so on.

Figure 5:
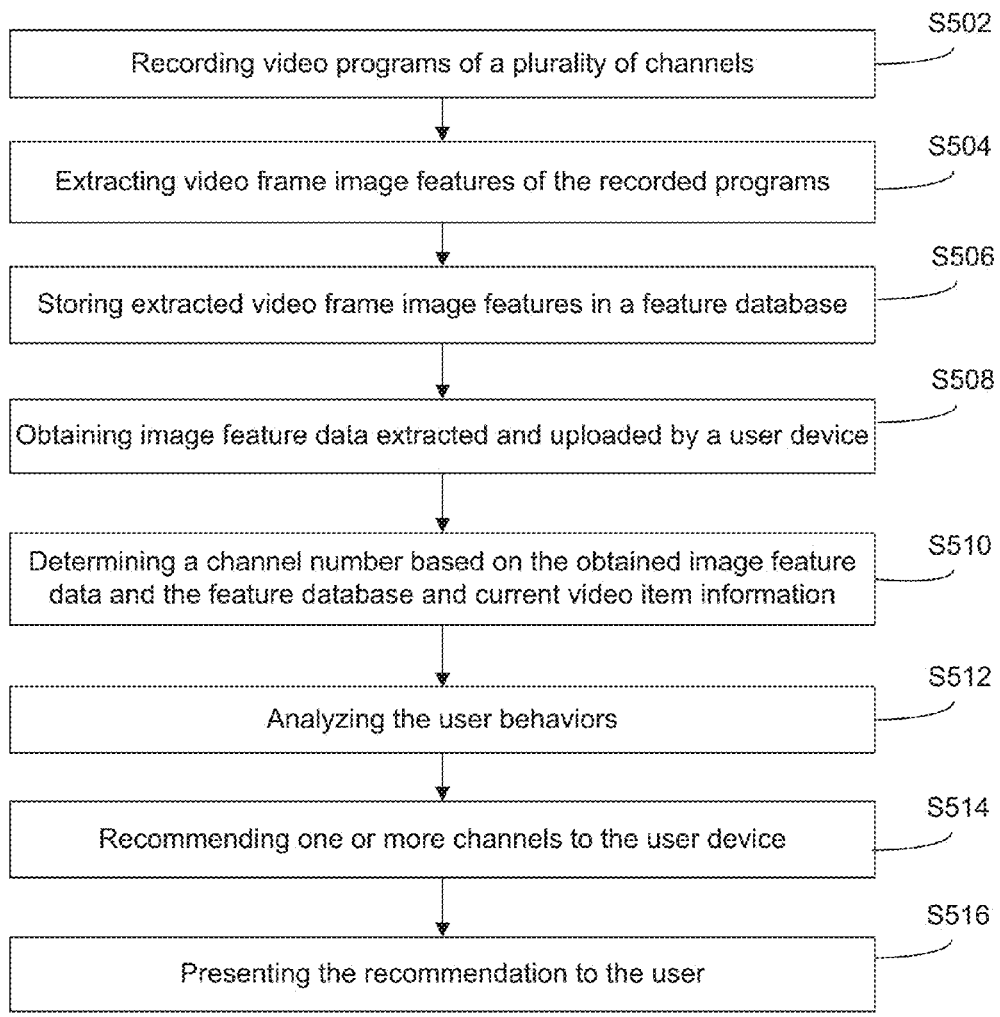
FIG. 5 illustrates a flow chart of an exemplary personalized channel recommendation process consistent with the disclosed embodiments.

In operation, the cloud platform 306 (e.g., server 106), the TV 102, and/or the remote control 104 perform a personalized channel recommendation process to skip undesired program and to go to desired programs. FIG. 5 illustrates an exemplary channel recommendation process.

As shown in FIG. 5, at the beginning, video programs of a plurality of channels may be recorded (S502). For example, the recorder 30614 may record video sequences of each of a plurality of channels, Channel 1, Channel 2, . . . , Channel n. The video programs may contain both desired contents and undesired contents. The criteria for determining what content is desired or undesired may be configured by the user of TV 102 or may be automatically configured by the server 106. For example, the user may determine that advertisement or commercials (Ads) is undesired program or adult programs are undesired programs.

Further, video frame image features of the recorded programs are extracted (S504). For example, the feature extraction module 30604 may extract features of video frames of each of the plurality of channels based on certain criteria and algorithms. The image features may be global features or may be local features, or maybe a combination of global features and local features.

Further, the extracted features may be stored in a feature database (S506). For example, the extracted features of each of the plurality of channels for the image classification may be stored in the feature database 30602.

When a user device (e.g., TV 102, a smart phone, etc.) is playing back video programs, the user device may also extract video image features of the program being watched by the user. For example, the image sampler 30402 may sample incoming video stream and divide the video stream into video components, and the feature extraction module 30404 may extract image features. The extracted image features of the user device may then be transmitted as image feature data to the cloud platform 306 (e.g., server 106) for classification (S508).

Further, based on the image feature data from the user device and the features stored in the feature database 306, a channel number may be determined (S510). For example, the image classifier 30606 may compare the obtained set of features of the image from the user device with the stored features of each of the plurality of channels to determine a current channel of the broadcast being captured as well as current video item information.

That is, the image classifier 30606 determines the channel of the captured image based on the comparison of the user-device-submitted feature set and the feature database 30602. The feature dataset is organized for data retrieval, and the results are also feed into the user behavior analyzer 30608 and the video item tracker module 30610.

Because the feature extraction module 30604 may extract features based on classification of the image features, the extracted features of the selected plurality of video frames may include global features describing an entire frame image and/or local features using descriptors of local image neighborhoods computed at multiple interest points. The image classifier 30606 may be configured to match the feature classification of the feature extraction module 30604.

Figure 6:
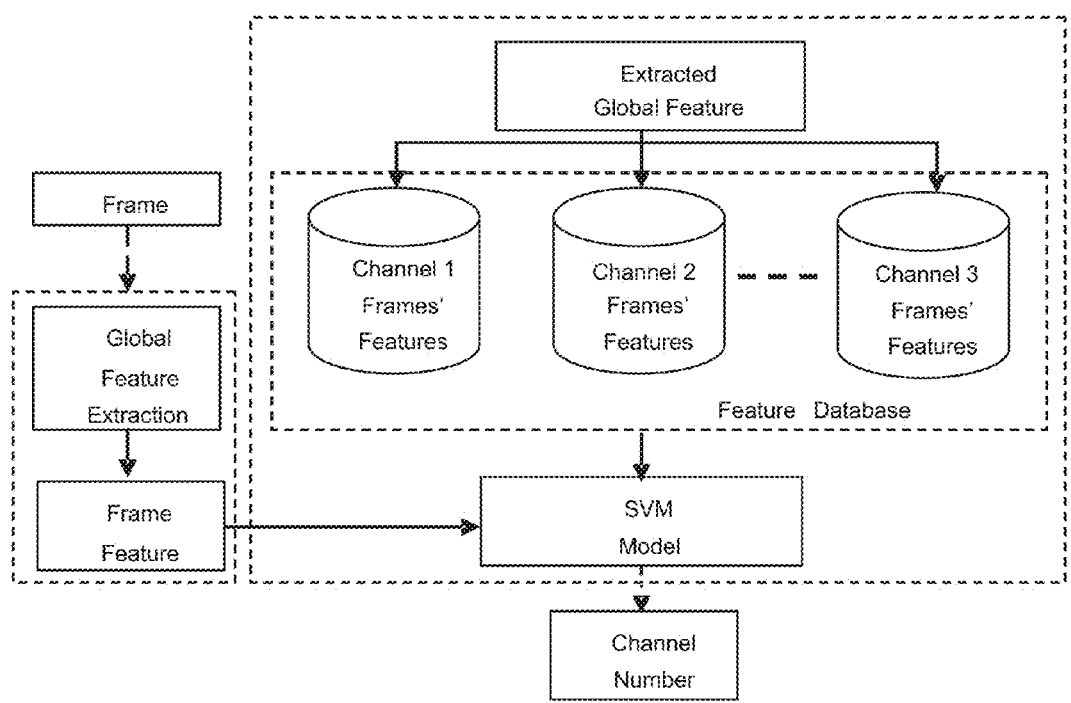
FIG. 6 illustrates a schematic diagram of an exemplary global feature extraction system consistent with the disclosed embodiments.
Figure 7:
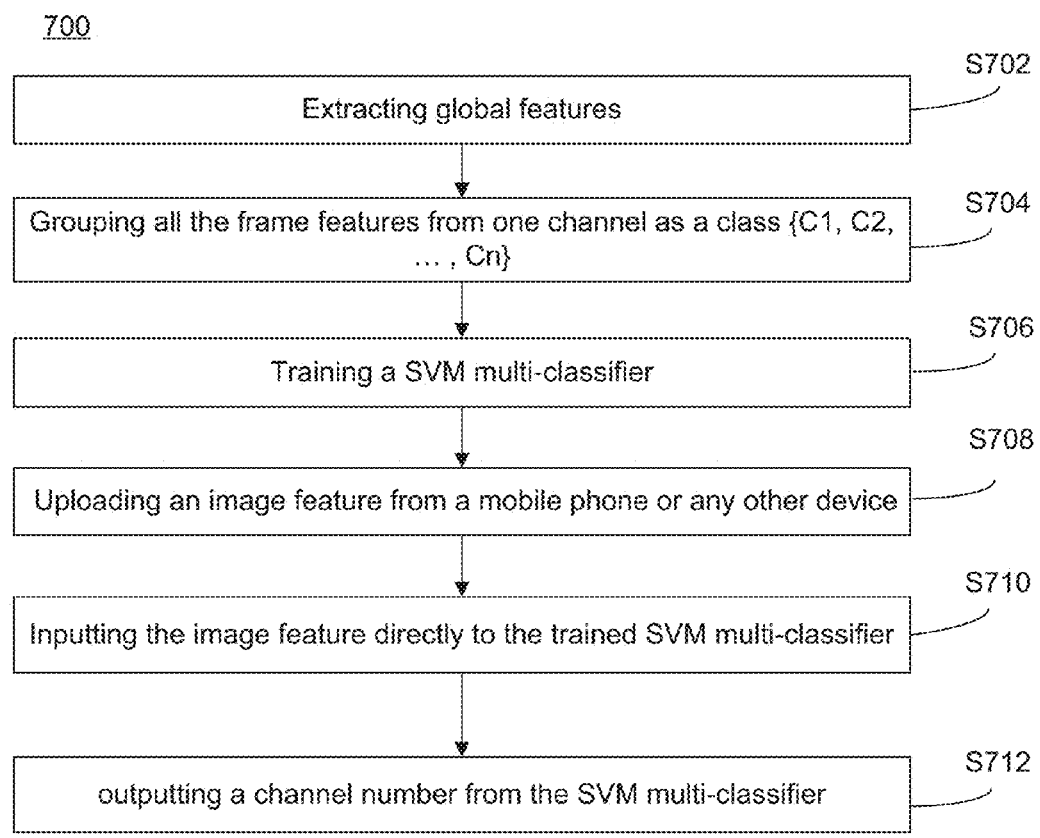
FIG. 7 illustrates a flow chart of an exemplary global feature extraction process consistent with the disclosed embodiments.

The image classifier 30606 may include image classification systems using global features that describe an entire image. Most shape and texture descriptors fall into this category. FIG. 6 illustrates a schematic diagram of an exemplary global feature extraction system for image classification, and FIG. 7 illustrates a flow chart of an exemplary global feature extraction process 700 for image classification consistent with the disclosed embodiments.

As shown in FIG. 6, the video frames are processed and the global feature extraction is performed on the video frames, and the extracted frame feature is transmitted to a support vector machine (SVM) model. The SVM model may then determine the channel number based on the frame feature and the feature database containing extracted global features.

Global features may produce compact representations of images, where each image corresponds to a point in a high dimensional feature space. The SVM model may be configured for machine learning of high-throughput classification and may include a supervised learning model with associated learning algorithms that analyze data and recognize patterns, for classification and regression analysis. In other words, given labeled training data, the algorithm outputs an optimal hyper plane which categorizes new examples.

Typically, supervised learning has a training stage. In a training stage, after feature extraction, all the frame features from one channel are grouped as a class {C1, C2, . . . , Cn}, and the SVM multi-classifier is trained. In a test stage (i.e., operational stage), the global image/photo features uploaded from the user device (e.g., a TV or a mobile phone) directly goes to trained SVM multi-classifier, which finally determines the channel number.

More specifically, as shown in FIG. 7, the global feature extraction process may include a training stage and a test stage. In the training stage, global features are extracted first (S702). After extracting global features, all the frame features from one channel are grouped as a class {C1, C2, . . . , Cn} (S704), and a support vector machine (SVM) multi-classifier is trained (S506). In the test stage, an image feature is uploaded from the user device (S708). Then, the image feature is directly inputted to the trained SVM multi-classifier (S710). Finally, the SVM multi-classifier outputs results, including a channel number (S712).

Figure 8:
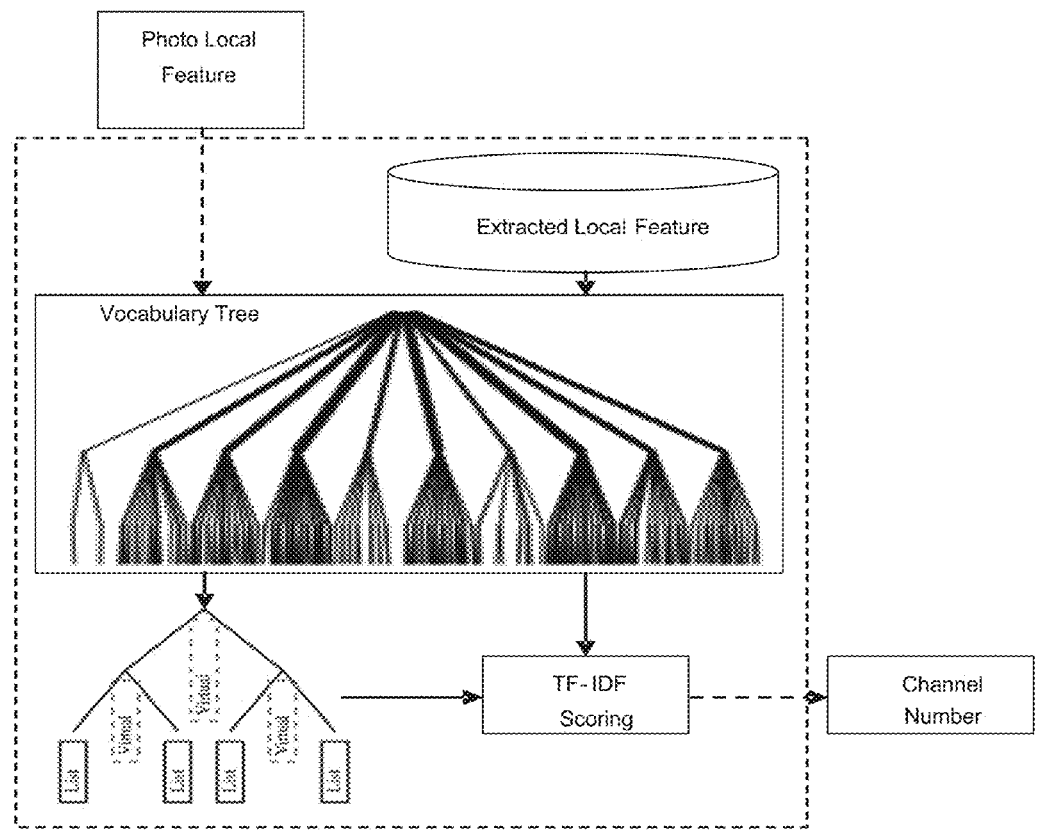
FIG. 8 illustrates a schematic diagram of an exemplary local feature extraction system consistent with the disclosed embodiments.

Further, the image classifier 30606 may include image classification systems using local features that describe areas or points of the image. FIG. 8 illustrates a schematic diagram of an exemplary local feature extraction system for image classification, and FIG. 9 illustrates a flow chart of an exemplary local feature extraction process 900 for image classification consistent with the disclosed embodiments.

As shown in FIG. 8, the classification system uses local features, which are descriptors of local image neighborhoods computed at multiple interest points. Typically, interest points are detected at multiple scales and are expected to be repeatable across different views of an object. For example, certain feature types, such as the Scale-Invariant Feature Transform (SIFT) and Speeded-Up Robust Features (SURF), may be used.

Descriptors extracted from local affine invariant regions may be quantized into visual words, which are defined by vocabulary tree that is built by hierarchical k-means clustering. A large set of representative descriptor vectors are used in the unsupervised training of the tree. The collections of visual words are used in Term Frequency Inverse Document Frequency (TF-IDF) scoring of the relevance of an image to the query. Every node in the vocabulary tree is associated with an inverted file, such that large databases can be scored efficiently.

Figure 9:
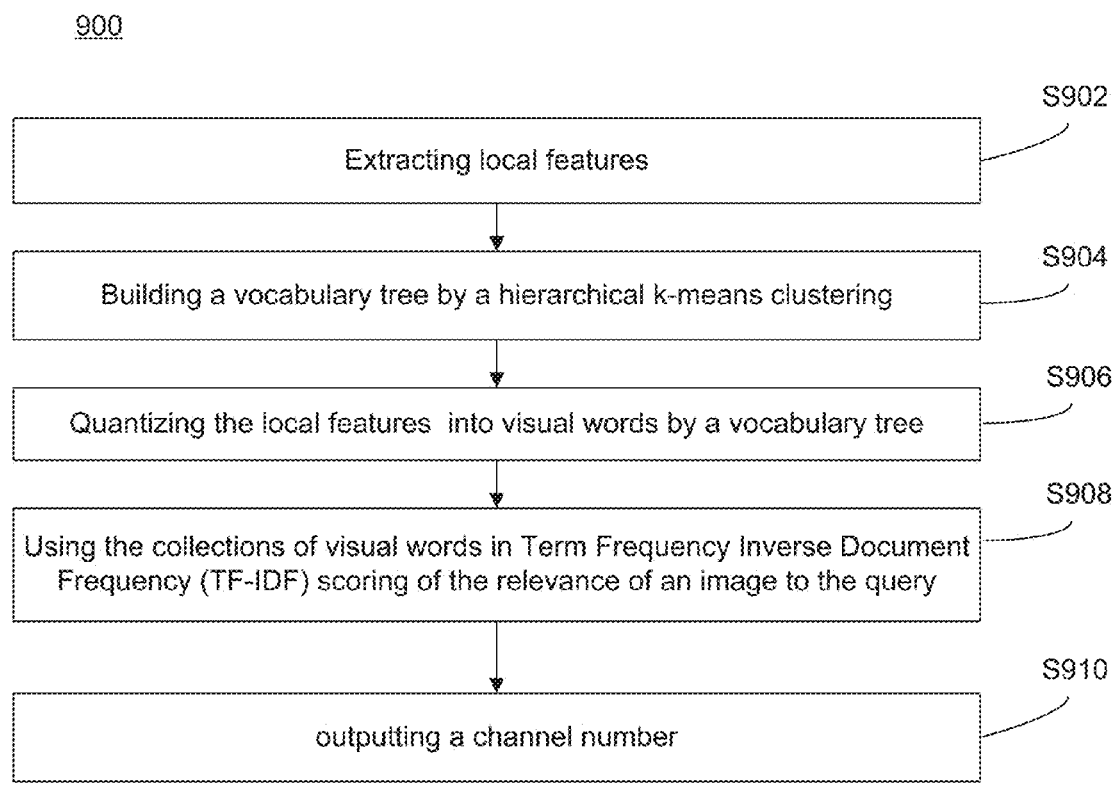
FIG. 9 illustrates a flow chart of an exemplary local feature extraction process for image classification consistent with the disclosed embodiments.

More specifically, as shown in FIG. 9, at the beginning of the local feature extraction process, local features are extracted (S902). The classification process uses local features, which are descriptors of local image neighborhoods computed at multiple interest points, which may be detected at multiple scales and are expected to be repeatable across different views of an object. The local features, such as the Scale-Invariant Feature Transform (SIFT) and Speeded-Up Robust Features (SURF) descriptors, are extracted from local affine invariant regions.

Then, a vocabulary tree is built by a hierarchical k-means clustering (S904). Further, the local features are quantized into visual words by the vocabulary tree (S906). A large set of representative descriptor vectors are used in the unsupervised training of the tree. In addition, the collections of visual words are used in Term Frequency Inverse Document Frequency (TF-IDF) scoring of the relevance of an image to the query (S908). To score efficiently with large databases, inverted files are used, where every node in the vocabulary tree is associated with one inverted file. Finally, a channel number is outputted (S910).

Thus, depending on whether global features or local features are used, the image classifier 30606 may determine that the image features from the user device corresponding to one or more undesired programs and the channel number corresponding to the undesired program. The channel number may be provided to the user behavior analyzer 30608, the video item tracker 30610, and the channel recommender for further processing. Further, related video item number may also be provided to the video item tracker 30610 to determine start and end of the corresponding undesired program from the channel number.

Returning to FIG. 5, after the channel number is determined (S510), user behaviors are analyzed based on the determined channel number (S512). More specifically, the user behavior analyzer 30608 may monitor the user's interactions, detect the user's mood, and evaluate the user's behavior pattern (e.g., use pattern on the remote control).

For example, a user may be able to fluently transverse the TV channels via digital keys on the remote control, a user may only limit himself/herself in arrow keys to move around, or a user may use zooming functions frequently. The analysis results of the user behavior analyzer 30608 may be outputted to other modules or units, such as the channel recommender 30612.

The behavior analyzer 30608 may also record all the channels on which the user paid attention (e.g., staying for more than 2 seconds) and the reactions of a user after receiving the recommendation from the channel recommender.

The user behavior may be analyzed from many aspects in order to determine the relationships between user's behavior and his/her preferences. For example, the user behavior analyzer 30608 may determine the current mood of the user by, e.g., the click pace of the user interaction, the content genre selected for watching, and so on.

The user behavior analyzer 30608 may also determine the key usage pattern or the user's habit in utilizing the remote control. For example, some users may play remote control in a fluent manner, while others may only explore limited keys on the remote control. Also, the user behavior analyzer 30608 may determine whether the user is a single consumer or a family, e.g., the user's content selection. The men, women, kids, elders may have different taste on the content selection. For a family with members having almost the same taste, the family may be treated as a single consumer.

The user behavior analyzer 30608 may also determine the usage model of the TV, for example, typical watching hours, frequency, content sources, and so on. Different people may have different key usage patterns, which includes the frequency of remote control usage, the frequency of certain key usage, and the frequency of certain key transferring. For example, the user behavior analyzer 30608 may maintain probability tables for the usage patterns and use the probability tables in identifying the user or user group and the user's behavior model.

In certain embodiments, a data mining process may be used to perform user behavior analysis by the user behavior analyzer 30608. During the data mining process, the behavior analyzer 30608 may consider and determine certain user behaviors.

For example, the behavior analyzer 30608 may determine what is the user's reaction to the undesired program (e.g., advertisements or a certain program including advertisements or Ads) and how is the user's trust to the channel recommender (e.g., the frequency or how often the user follows the channel recommended by the channel recommender.

When the undesired program is detected, the channel recommender may send out a notification to the user, and may provide the user with 3 options: (a) ignoring the recommendation and staying with the current channel; (b)

switching to the channel recommended; or (c) switching to another channel not recommended.

When the user ignores the recommendation and stays with the current channel, it may indicate that the user maybe a fan of the undesired content (e.g., a fan of Ads). The system may determine that there may be no point of keeping the recommendation, and may correspondingly reduce the frequency of the recommendation for skipping the undesired program to avoid annoying the user.

When the user switches to the channel recommended, it may indicate that the user may be a supporter of channel recommendation. The system may provide a highlighted (or richer) channel recommendation for user selection.

When the user switches to another channel that is not recommended, it may indicate that the user does not treat the channel recommender as a good support. The system may cause the recommendation to be low-lighted to avoid annoying the user and, at meantime, may adjust the channel recommendation further according to the user preference more accurately.

In cases where the user does not stay with the current channel being determined as the undesired channel, it may also be referred that the user's opinion is strong toward the undesired program.

In a family environment, there may be multiple viewers in front of TV, or multiple users use TV at different timeslots, therefore the user behavior modeling should be processed with a mixture Gaussian model. A vector $<X_i>$ is used, where Xi belongs to $\{0, 1, 2\}$ to denote user's reaction to the channel recommender according to the cases (a), (b), and (c) mentioned above, and $X_i$ represents a number of timeslots that the users are watching TV.

A simplified version may be used for the user behavior analysis. The user reaction is modeled and represented by a mixture of K Gaussian distributions (e.g., K=1 for the case $X_i$ is a binary value), where each Gaussian is weighted according to the frequency with which it belongs to the specific category. So the probability that the user prefers $X_t$ at time t is estimated by:

$$P(X_t) = \sum_{i=1}^{K} w_{i,t} \frac{1}{\sqrt{2\pi}\,\sigma_i} e^{-\frac{1}{2}(X_t-\mu_{i,t})^T \sum^{-1}(X_t-\mu_{i,t})} \quad (1)$$

where $w_{i,t}$ is the normalized weight, $\mu_i$ and $\sigma_i$ are the mean and the standard deviation of the $i_{th}$ distribution, respectively.

The most influential distribution in the mixture form is used to determine if the current user has a specific preference or not. In the Gaussian distributions with the most supporting evidence and the least variance, the K distributions are sorted based on the value of $w/\sigma$ and an ordered list is maintained, consequently to keep the most likely distributions on top and the leave less probable state-transient distributions to bottom.

The most likely distribution models for a content category are obtained by:

$$B = \arg\min_b (\Sigma_{j=1}^{b} w_j > T) \quad (2)$$

where $w_j$ is the weight, and a threshold T is the fraction of the total weight given to a specific category.

The current user in the evaluation is checked against the existing K Gaussian distributions to detect if the distance between the mean of a distribution and the current pixel intensity is within 2.5 times of standard deviation of this distribution. If none of the K distributions succeeds in the evaluation, the least probable distribution which has the smallest value of $w/\sigma$ is replaced by a new Gaussian distribution with the current value as its mean, a pre-assigned high variance, and low prior weight. Otherwise, if the matched distribution is one of the B distributions, the user preference is marked.

To keep the model adaptive, the model parameters are continuously updated using the next content selection from the same user. For the matched Gaussian distribution, all the parameters at time t are updated with this new value $X_t$. In addition, the prior weight is updated by:

$$w_t = (1-\alpha)w_{t-1} + \alpha, \quad (3)$$

where $\alpha$ is learning rate controlling adaptation speed, and $1/\alpha$ defines a time constant which determines change. The mean and variance are updated respectively by:

$$\mu_t = (1-\rho)\mu_{t-1} + \rho X_t, \quad (4)$$

and $$\sigma_t^2 = (1-\rho)\sigma_{t-1}^2 + \rho(X_t-\mu_t)^2 \quad (5)$$

where $\rho$ is the probability associated with the current user and scaled by the learning rate $\alpha$. So $\rho$ can be represented by:

$$\rho = \alpha \cdot \frac{1}{\sqrt{2\pi}\,\sigma_t} e^{-\frac{(X_t-\mu_t)^2}{\sigma_t^2}}. \quad (6)$$

For unmatched distributions, the mean and the variance remain unchanged, while the prior weight is updated by:

$$w_t = (1-\alpha)w_{t-1}, \quad (7)$$

By using this updating method, the original preference distribution remains in the mixture until it becomes the least probable distribution and a new preference is observed. So if this static preference happens to change, the previous preference distribution will be rapidly reincorporated into the model.

After the user behavior model is applied, the system is able to determine in a certain timeslot whether the user leans to having recommendation or not, thus an adaptive user interface can be shown to the user. For example, if the user tolerates the undesired program, the frequency of recommendation for skipping the undesired program is reduced to avoid annoying the user; if the user favors channel recommendation, a highlighted (or richer) recommendation is applied; if the user skips the program not following the channel recommendation, a lowlighted recommendation is applied.

In addition, the video item tracker 30610 may trace recognized video items that the user is watching to detect the moment that the undesired program starts and ends so that the channel recommender 30612 can recommend desirable content to the user or remind the user to return to the original channel after skipping the undesired program. That is, the video item tracker 30610 may provide timing for the channel recommender 30612 to recommend alternative channel(s) or to recommend returning to the original channel.

Further, returning to FIG. 5, the channel recommender 30612 may recommending one or more channels to the user device based on inputs from the user behavior analyzer 30608 and/or the video item tracker 30610 (S514).

For example, the channel recommender 30612 may recommend to the user which channel to go for skipping the undesired program. To ensure the quality of the recommendation, the channel recommender 30612 may use an algorithm considering certain factors, such as the user preference, channel viewing trend, content correlation before and after switching channels, possible future undesired program detection, and so on.

More specifically, the channel recommendation algorithm may include following logic elements or logic conditions: (a) The recommended channel does not contain immediate undesired program; (b) The recommended channel has program highly correlated with the current program in watching; (c) The recommended channel has programs that fit into the user's preference; and (d) A collaborative filtering approach uses the trend of channel swapping of other people as guidance for recommendation. Other logic elements may also be included.

In operation, the above logic conditions do not need to be all satisfied. Instead, a weighted system may be used to set priority for the recommended channel for meeting one or more of the above logic conditions.

Further, an electronic program guide (EPG) for the plurality of channels may be studied in advance such that all the programs are classified ahead of time into a number of categories, such as drama, action, documentary, and so on. Some programs may also have more meta data, such as actors/actresses, director, and so on. Thus, for certain undesired programs, such as Ads, with uncertain guide information (e.g., program duration), information about these programs can be estimated and/or predicted via the history data.

Further, as previously explained, user's TV watching behavior indicating user preference may also be collected and analyzed, and the channel swapping trends of all users may be obtained and patterns of common behavior among multiple user (e.g., family users) may be detected.

To make the problem more generic, the channel recommender may be able to recommend a user to switch from one channel (or one program) to another channel (or another program) at any time based on above logic elements.

Provided that, the N programs shown on N channels at the current time are represented by $P=\{P_1, P_2, \ldots P_N\}$; and $T(P_i, P_j)$ is the best switch from $P_i$ to $P_j$ is guided by the channel recommender; $S(P_i, P_j)$ is the similarity between 2 programs; $Q(P_j)$ is the predicted proportion of immediate undesired program; $U(P_j)$ is the degree of the program that matches user's preference or interest; and $C(P_i, P_j)$ is the probability of the group of users switch from $P_i$ to $P_j$, the problem is to find a channel j that $$\underset{j}{\text{Minimize}} T(P_i, P_j) = \alpha Q(P_j) + \beta S(P_i, P_j) + \gamma U(P_j) + (1 - \alpha - \beta - \gamma) C(P_i, P_j) \quad (8)$$

where $P_i$ is the current program in watching, and $\alpha$, $\beta$, $\gamma$ are weight parameters between [0, 1] to be adjusted by users.

Thus, there may be various methods to calculate function S and U in Equation 8. A typical method for 2 programs to compare with each other for similarity (e.g., the S function) is to use a Sim operation shown in Equation 9 below on the content characteristic vectors of the programs. The Sim operation is defined by:

$$\text{Sim}(X, Y) = \cos(X_i, Y_i) = \frac{X_i \cdot Y_i}{\|X_i\| \|Y_i\|}. \quad (9)$$

where X and Y are vectors being compared.

The same Sim operation can also be applied to the U function. That is, the program characteristic vector is compared with the user preference vector.

The Q function evaluates the percentage of undesired programs contained during the period that program is switched to channel j before returning to channel i. For the C function, it is based on statistics of group users' common behavior, thus the probability can be calculated as the frequency (or percentage) of a switch from one channel to another channel in the group. Other methods may also be used.

Thus, based on the determined channel number, the program information, and/or the user behavior or preference, the channel recommender 30612 may recommend an alternative channel for the channel showing the undesired program. The channel recommender 30612 may recommend returning to the original channel when the undesired program ends.

The recommendation may be transmitted to the user device such that the user device may present the recommended channels to the user (S516). For example, the user device may use the output user interface to prompt the user to switch an alternative channel while undesired programs are shown to the user, or display a menu on the display screen or at the lower edge of the display screen for the user to select whether to switch to the recommended channel or to select from a list of recommended channels to be switched to. That is, the user device and the channel recommender may generate an adaptive TV guide for the user to skip the undesired program and to switch to the desired channel, and to return to the channel of the undesired program when the undesired program ends.

Additionally or optionally, the output user interface 30406 may be implemented in the remote control equipped with special buttons, such as a skip Ads button, a return-to-program button, etc., such that the user can directly control the channel selection and program returning without menu display on the screen. Other method may also be used.

By using the disclosed systems and methods, many advantageous applications can be implemented. For example, a recommendation can be displayed to the user for content entertainment selection. The recommendation model can link a few technical modules together into an automatic TV guide process, where an automatic content recognition process handles the current channel detection as well as the current program recognition; a user behavior analytics process handles the user preference understanding; and a content mining process handles the program catalog analysis. Once an undesired program is detected, the system uses the mining results from content and user behavior understanding modules to achieve channel recommendation to help users get away from the undesired program right away.

It is understood that the disclosed recommendation model is not limited to TV usage scenario. The disclosed systems and methods can also be applied to any devices with displays, such as smart phones, tablets, PCs, smart watches, and so on. The intelligence computed from the cloud platform is synchronized with the device to achieve the personalized recommendation experiences. That is, the disclosed methods not only can be used for systems for generating adaptive TV guide to skip undesired video programs, but also can be applied as the core function for other systems, such as other content recommendation systems, information retrieval systems, and so on.

For example, in a content recommendation system, a cloud platform may extract features of received contents (e.g., images, webpages, documents, etc.) for classification and analyze user behaviors of at least one user.

When the user behaviors are analyzed, the user reaction is modeled and represented by a mixture of K Gaussian distributions (e.g., K=1 for the case $X_t$ is a binary value), where each Gaussian is weighted according to the frequency with which it belongs to the specific category. So the probability that the user prefers $X_t$ at time t is estimated by:

$$P(X_t) = \sum_{i=1}^{K} w_{i,t} \frac{1}{\sqrt{2\pi}\sigma_i} e^{-\frac{1}{2}(X_t - \mu_{i,t})^T \sum^{-1}(X_t - \mu_{i,t})} \quad (1)$$

where $w_{i,t}$ is the normalized weight, and $\mu_i$ and $\sigma_i$ are the mean and the standard deviation of the $i_{th}$ distribution, respectively.

The most influential distribution in the mixture form is used to determine if the current user has a specific preference or not. In the Gaussian distributions with the most supporting evidence and the least variance, the K distributions are sorted based on the value of $w/\sigma$ and an ordered list is maintained, consequently to keep the most likely distributions on top and the leave less probable state-transient distributions to bottom.

Further, the cloud platform may generate adaptive content guide to skip undesired contents based on the extracted features of the received contents and the user behaviors.

In addition, an endpoint device (e.g., a smart phone, a tablet, etc.) may display the recommended contents to the at least one user based on the generated adaptive content guide.

Further, although personalized content recommendation is disclosed for illustrative purposes, similar concept and approach can be applied to other recommendation systems, for example, application recommendation, restaurant recommendation, house recommendation, and so on.

Other applications, advantages, alternations, modifications, or equivalents to the disclosed embodiments are obvious to those skilled in the art.

What is claimed is:
1. A personalized channel recommendation method, comprising:
recording video programs of a plurality of channels;
extracting image features of the recorded video programs of the plurality of channels;
storing the extracted image features of the recorded video programs of the plurality of channels in a feature database;
obtaining image feature data extracted from a video program being viewed by at least one user of a user device on a current channel;
detecting that the video program being watched by the user is an undesired program and determining a channel number of a channel of the video program being watched based on the image feature data and the feature database;
determining channel recommendation including at least one desired channel to be switched to from the undesired program;
generating an adaptive TV guide for the user to skip the undesired program and to switch to the desired channel, wherein the adaptive TV guide comprises a notification to the user with at least the following options: (a) ignoring the channel recommendation and staying with the current channel; (b) switching according to the channel recommendation; and (c) switching to another channel not recommended; and
when the user ignores the channel recommendation and stays with the current channel, reducing a frequency of the channel recommendation for skipping the undesired program.

2. The method according to claim 1, wherein determining the channel recommendation and generating the adaptive TV guide further includes:
performing user behavior analysis on the at least one user of the user device using a data mining process to determine the user's reaction to the undesired program and the user's trust to the channel recommendation.

3. The method according to claim 1, further including:
when the user switches channel according to the channel recommendation, providing a highlighted channel recommendation for the user; and
when the user switches to another channel not recommended, providing a low-lighted channel recommendation for the user.

4. The method according to claim 1, wherein extracting the image features of the recorded video programs and determining the channel number further includes:
extracting global features of the recorded video programs the plurality of channels;
grouping all global features of recorded video programs from each channel as a class;
training a support vector machine (SVM) multi-classifier using the grouped global features of the recorded video programs; and
inputting the image feature data from the user device directly to the trained SVM multi-classifier such that the trained SVM multi-classifier outputs the channel number.

5. The method according to claim 1, wherein extracting the image features of the recorded video programs and determining the channel number further includes:
extracting local features of the recorded video programs the plurality of channels;
building a vocabulary tree by a hierarchical k-means clustering;
quantizing the local features into visual words by the vocabulary tree; and
using the visual words in term-frequency inverse-document-frequency (TF-IDF) scoring of relevance of the image feature data from the user device to determine the channel number.

6. The method according to claim 1, wherein determining the channel recommendation further includes:
using a weighted system to set priority for a recommended channel for meeting one or more of a plurality of logic conditions including at least:
the recommended channel does not immediately contain the undesired program;
the recommended channel has programs highly correlated with the current program being watched;
the recommended channel has programs that fit into user preference; and
a collaborative filtering based on a trend of channel swapping of other users as guidance for channel recommendation.

7. The method according to claim 6, further including:
provided that, N programs shown on N channels at current time are represented by $P=\{P_1, P_2, \ldots P_N\}$, N being an integer; and $T(P_i, P_j)$ is an estimated best switch from program $P_i$ to program $P_j$; $S(P_i, P_j)$ is similarity between program $P_i$ to program $P_j$; $Q(P_j)$ is a predicted proportion of a immediate undesired program; $U(P_j)$ is a degree of a program that matches the user preference; and $C(P_i, P_j)$ is a probability of a group of other users switch from program $P_i$ to program $P_j$;

finding a channel j that satisfying:

$$\underset{j}{\text{Minimize}} T(P_i, P_j) = \\ \alpha Q(P_j) + \beta S(P_i, P_j) + \gamma U(P_j) + (1 - \alpha - \beta - \gamma) C(P_i, P_j),$$

wherein $\alpha$, $\beta$, $\gamma$ are weight parameters between [0, 1] to be adjusted by the user.

8. The method according to claim 1, wherein generating the adaptive TV guide for the user to skip the undesired program and to switch to the desired channel further includes:
   providing a remote control equipped with at least a skip-program button and a return-to-program button such that the user directly switches to a recommended channel without menu display on a display screen of the user device.

9. A personalized channel recommendation system, comprising:
   a recorder module configured to record video programs of a plurality of channels;
   a feature extraction module configured to extract image features of the recorded video programs of the plurality of channels and to store the extracted image features of the recorded video programs of the plurality of channels in a feature database;
   an image classifier module configured to obtain image feature data extracted from a video program being viewed by at least one user of a user device on a current channel, to detect that the video program being watched by the user is an undesired program, and to determine a channel number of a channel of the video program being watched based on the image feature data and the feature database;
   a channel recommender module configured to determine channel recommendation including at least one desired channel to be switched to from the undesired program, and to generate an adaptive TV guide for the user to skip the undesired program and to switch to the desired channel; and
   a user behavior analyzer module configured to:
      when the undesired program is detected, send out a notification to the user with a plurality of options including: (a) ignoring the channel recommendation and staying with the current channel; (b) switching according to the channel recommendation; and (c) switching to another channel not recommended, and
      when the user ignores the channel recommendation and stays with the current channel, reduce a frequency of the channel recommendation for skipping the undesired program.

10. The system according to claim 9, wherein the user behavior analyzer module is further configured to:
   form user behavior analysis on the at least one user of the user device using a data mining process to determine the user's reaction to the undesired program and the user's trust to the channel recommendation.

11. The system according to claim 9, wherein the user behavior analyzer module is further configured to:
   when the user switches channel according to the channel recommendation, provide a highlighted channel recommendation for the user; and
   when the user switches to another channel not recommended, provide a low-lighted channel recommendation for the user.

12. The system according to claim 9, wherein the feature extraction module is further configured to:
   extract global features of the recorded video programs the plurality of channels;
   group all global features of recorded video programs from each channel as a class;
   train a support vector machine (SVM) multi-classifier using the grouped global features of the recorded video programs; and
   input the image feature data from the user device directly to the trained SVM multi-classifier such that the trained SVM multi-classifier outputs the channel number.

13. The system according to claim 9, wherein the feature extraction module is further configured to:
   extract local features of the recorded video programs the plurality of channels;
   build a vocabulary tree by a hierarchical k-means clustering;
   quantize the local features into visual words by the vocabulary tree; and
   use the visual words in term-frequency inverse-document-frequency (TF-IDF) scoring of relevance of the image feature data from the user device to determine the channel number.

14. The system according to claim 9, wherein the channel recommender module is further configured to:
   use a weighted system to set priority for a recommended channel for meeting one or more of a plurality of logic conditions including at least:
      the recommended channel does not immediately contain the undesired program;
      the recommended channel has programs highly correlated with the current program being watched;
      the recommended channel has programs that fit into user preference; and
      a collaborative filtering based on a trend of channel swapping of other users as guidance for channel recommendation.

15. The system according to claim 14, wherein the channel recommender module is further configured to:
   provided that, N programs shown on N channels at current time are represented by $P=\{P_1, P_2, \ldots P_N\}$, N being an integer; and $T(P_i, P_j)$ is an estimated best switch from program $P_i$ to program $P_j$; $S(P_i, P_j)$ is similarity between program $P_i$ to program $P_j$; $Q(P_j)$ is a predicted proportion of a immediate undesired program; $U(P_j)$ is a degree of a program that matches the user preference; and $C(P_i, P_j)$ is a probability of a group of other users switch from program $P_i$ to program $P_j$;
   find a channel j that satisfying:

$$\underset{j}{\text{Minimize}} T(P_i, P_j) = \\ \alpha Q(P_j) + \beta S(P_i, P_j) + \gamma U(P_j) + (1 - \alpha - \beta - \gamma) C(P_i, P_j),$$

wherein $\alpha$, $\beta$, $\gamma$ are weight parameters between [0, 1] to be adjusted by the user.

* * * * *